United States Patent [19]

Benham

[11] Patent Number: 5,572,985
[45] Date of Patent: Nov. 12, 1996

[54] RECIRCULATING SYSTEM WITH BY-PASS VALVE

[76] Inventor: Roger A. Benham, P.O. Box 830, San Diego, Calif. 92112

[21] Appl. No.: 571,111

[22] Filed: Dec. 12, 1995

[51] Int. Cl.⁶ ..................................................... F24H 1/00
[52] U.S. Cl. .......................... 126/362; 237/8 C; 237/8 A
[58] Field of Search .......................... 126/362; 237/8 C, 237/8 A, 59, 63; 236/12.13, 23, 32

[56] References Cited

U.S. PATENT DOCUMENTS

| | | | |
|---|---|---|---|
| 2,334,679 | 11/1943 | Mason et al. | 276/23 |
| 2,661,906 | 12/1953 | Stahlberg | 237/8 C |
| 3,413,969 | 12/1968 | Whittel | 126/362 |
| 3,958,555 | 5/1976 | Horne | 126/362 |
| 5,119,988 | 6/1992 | Fiedrich | 237/8 C |

*Primary Examiner*—Carroll B. Dority
*Attorney, Agent, or Firm*—Baker, Maxham, Jester & Meador

[57] ABSTRACT

A recirculating hot water system comprises a boiler for heating a continuous supply of hot water, a recirculating water line comprising a supply line connected to an outlet of the boiler for conveying water from the boiler to at least one use station and a return line for returning water not consumed at the station to the boiler, a circulating pump in the return line for continuously circulating water in the water line, a by-pass circuit for by-passing the recirculating line connected at an outlet of the pump and an inlet to the pump, and a by-pass valve in the recirculating line at the by-pass line for directing water at a predetermined temperature through the by-pass line.

16 Claims, 2 Drawing Sheets

RECIRCULATING SYSTEM WITH BY-PASS VALVE

BACKGROUND OF THE INVENTION

The present invention relates to fluid recirculating systems and pertains particularly to an improved hot water recirculating system pumping rate control device.

It has become commonplace in the building industry to use a centrally located hot water heater or boiler circulating system to distribute hot water to a multiple of service locations. This type of hot water system includes the use of a centrally located tank heater, or tube bundle type of heater, with a circulating pump located at the end of the piping for returning water to the heater or boiler. The circulating pump typically operates continuously, or intermittently by way of a timer, to maintain hot water throughout the supply line. The system provides immediate hot water to the multiple hot water service locations. The circulating pump allows the hot water user to have immediate hot water on demand and eliminates the excessive wastage of water and time created by having to wait for the hot water to discharge the standing cooled water and to come all the way from the hot water source.

Over the years, users have discovered problems with the hot water circulating system described above. One particular problem is with the high water flow-rates caused by the circulating pumps not being sufficiently matched to the system. The typical system is provided with a pump that is oversized or too large for the system resulting in high flow rates. High water flow-rates in the circulating system cause excessive wear-and-tear on the plumbing components. These higher water flow-rates also result in energy wastage by way of the elevated temperature of the return line creating excessive heat loss to the atmosphere. The result of the high flow rates is that water is usually returned to the boiler at a temperature only several degrees less than the supply water temperature. The typical supply water is about 130 to 140 degrees and should return to the tank or boiler at about 110 degrees.

One method that has been used in an effort to reduce the problem of wear-and-tear and energy wastage is to use a timer that shuts off the circulating pump during the late evening and early morning. However, this approach does not control the operating temperature in the hot water return line and does not address the problem of excessive flow-rates which cause wear-and-tear damage. The constant cycling of the pump can create a more severe wear-and-tear problem by inducing cyclic loads on the system, and by creating accelerated corrosion of the piping by creating local anode sites due to the thermal expansion and contraction of the metal. Also, the use of timers renders the hot water circulating system inoperable during the late evening and early morning, which can make the hot water users unhappy.

Another approach that has been used to reduce the problem of wear-and-tear and energy wastage is to install a thermostat device at the circulating pump that shuts off the pump when it reaches a certain temperature. Again, this method does not address the problem of excessive flow-rates caused by pump oversizing. Also, the constant cycling of the pump, on-and-off, can create a more severe wear-and-tear condition by causing cyclic loading on the plumbing components, and by creating accelerated corrosion of the piping by creating local anode sites due to the thermal expansion and contraction of the metal.

Many of the above problems can be overcome by using the proper pump size to achieve the proper flow rate in the system. There are basically two methods to determine the proper pump size for a hot water circulating system. The first method involves the designer/engineer to calculate the "head-loss" of the piping circuit. After this is done the designer/engineer then refers to the pump manufacture's "pump performance charts". By comparing the calculated head-loss to the manufacture's pump performance chart, the designer/engineer can specify the proper pump size to achieve the desired flow-rate.

The second method to determine the proper pump size is similar to the first method, however, the approach is slightly reversed. For example, with an existing piping system it is very difficult to calculate the head-loss by determining the length of the pipe and the number and type of fittings. In this case, a flow-rate measuring device is installed to measure the flow-rate produced by a given pump size. With the measured flow-rate and the known pump type, by reference to the pump manufacture's pump performance chart, the head-loss can be determined. With this head-loss data, the properly sized pump could then be specified for the desired flow-rate.

It is therefore desirable that a water recirculation system be available to automatically control the return water temperature at a desired temperature and at the minimum acceptable velocity.

SUMMARY OF THE INVENTION

It is therefore a primary object of the present invention to provide a more efficient hot water circulating system.

In accordance with a primary object of the present invention, a hot water recirculating system is provided with a temperature responsive pump by-pass circuit for maintaining a predetermined temperature differential between supply and return water and for maintaining a minimum efficient flow rate in the system.

BRIEF DESCRIPTION OF THE PREFERRED EMBODIMENTS

The above and other objects and advantages of the present invention will become apparent from the following description when read in conjunction with the accompanying drawings wherein:

FIG. 1 is a schematic illustration of a system in accordance with a preferred embodiment of the present invention; and FIG. 2. is a side elevation view in section of an exemplary by-pass valve for the system of FIG. 1.

DETAILED DESCRIPTION OF THE PREFERRED EMBODIMENTS

Figure 1:
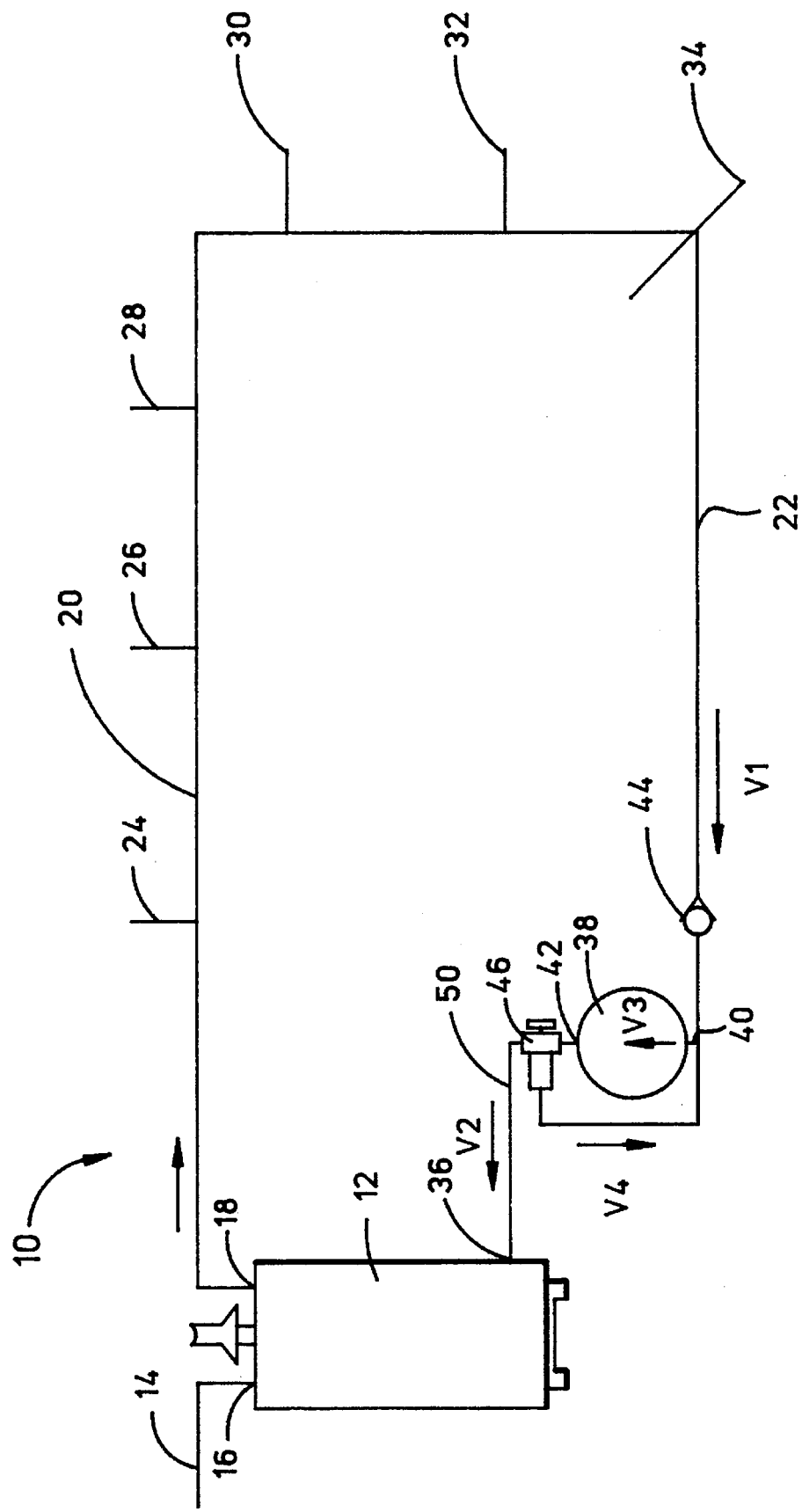

Referring now to FIG. 1 of the drawings, a hot water system in accordance with a preferred embodiment of the present invention is illustrated and designated generally by the numeral 10. This system is designed to effectively and automatically control both the temperature and flow-rate in the return line portion of the hot water circulating system.

The system comprises a source of hot water 12 in the form of a hot water heater or boiler of conventional construction. The hot water heater or boiler 12 is connected by way of a cold water make up or supply line 14 to a source of water which is heated in the boiler which may be either gas or electric energy and then supplied by way of an outlet 18 into a recirculating water line system comprising what will be termed a supply line portion 20 and a return line portion 22. The supply line portion includes one or more service or use sites 24, 26, 28, 30, 32 and 34, typically distributed along the line. The return line portion of the circulating system is that portion of the line between the last use site 34 and a return port or inlet 36 to the hot water heater 12.

A recirculating pump 38, having an inlet 40 and an outlet 42, is positioned in the hot water return line or portion 22 of the circulating system to maintain a flow of hot water. A check valve 44 in the return line before the pump inlet prevents back flow in the system. A temperature responsive or thermostatically actuated by-pass valve 46 connects between the outlet 42 of pump 38 and the inlet 36 of the water heater and into a by-pass line or circuit 48. This by-pass circuit with temperature responsive valve 46 is effective to control both the temperature and the velocity of the water in the circulating system. The valve 46 is preferably adjustable and may be set to maintain a return temperature in the water in the supply line or return line portion 50 between the pump outlet 42 and the heater inlet 36 at a predetermined level below that in the line 20 at the outlet from the heater. The temperature difference is on the order of about 10°–25° Fahrenheit for the typical system. This may be properly adjusted to maintain a continuous supply of hot water to each of the service user sites 22–34, and yet maintain a low velocity flow for efficient operation and a long life of the system.

This hot water system greatly reduces the problem of proper pump sizing by automatically regulating the flow rate and temperature in the return line to the most desirable level, regardless of the degree of oversizing of the pump. Controlling the flow in the hot water return line to the most desired temperature and velocity reduces the amount of wear-and-tear on the plumbing components and helps mitigate impingement corrosion damage and helps reduce energy wastage created by heat loss.

Figure 2:
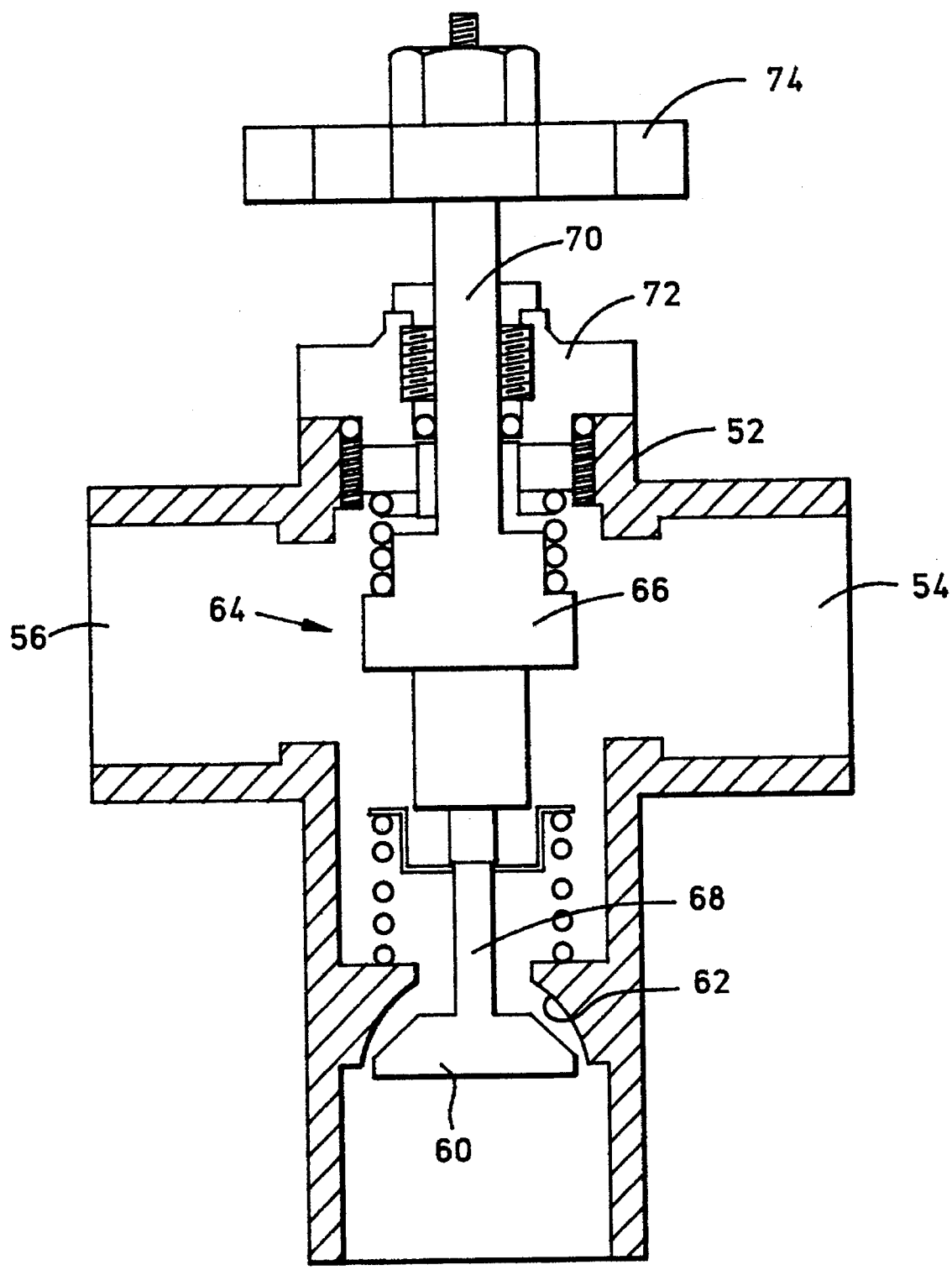

Referring to FIG. 2 of the drawings, details of a preferred form of the by-pass valve 46 are illustrated. The valve comprises a main body 52 having an inlet 54 and an outlet 56 connected via a throughpassage that is essentially unrestricted. The inlet and outlet ports 54 and 56 are in line for efficient flow and a by-pass for port 58 is at right angles to the main passage and flow of water in the system. A by-pass valve member 60 is supported on a valve stem 68 and positioned and adapted to seat in a by-pass valve seat 62. The by-pass valve 60 is mounted on a distal end of a valve stem assembly designated generally at 64, including a thermostatic actuator 66, mounted between an inner stem 68 and an outer stem 70. The stem portion 70 is threadably mounted in a gland packing nut assembly 72 to enable axial adjustment thereof by means of an adjustment knob 74. Preliminary adjustments in the position of valve 60 are made by movement of knob 74 with temperature responsive adjustments being made by the thermostatic actuator 66. Thus, temperature responsive actuator 66 operates to extend and retract the stem portion 68 carrying valve 60 and thereby adjust the positioning of the valve relative to its seat. As the valve opens it by-passes or permits the by-passing of a larger volume of the fluid normally circulating in the system via by-pass 48 to circulate through the pump 38.

In operation, as the water temperature approaches the desired temperature at the actuator 66, the valve opens and by-passes the water from the return line through the by-pass line 48. The valve regulates the flow rate at the outlet portion of the valve in order to maintain a constant temperature at the same outlet. The most desirable flow rate in this system is that minimum flow rate possible to maintain the desired difference in temperature between the hot water source outlet 18 and the end of the return line at inlet 36. The desired temperature differential between the hot water heater outlet 18 and inlet 36 is between about 10°–25° Fahrenheit. This temperature differential considerably reduces energy loss in the system, in accordance with the First Law of Thermodynamics.

With reference to FIG. 1 the flow-rate of water flowing V1 into pump 38 is equal to the flow-rate V2 in line 50. Flow rate V2 (equal to V1) can be variably controlled from Vmax to near zero by regulating flow through V4, from V3, with variable flow resistance through V4. With V4 controlled by thermally actuated valve 46 from totally closed to totally open position, the valve automatically regulates the temperature of the return water to a constant preset value. This simultaneously regulates the value of V1 to a desired minimum value.

An exemplary system will minimize restrictions in the circulating system to minimize losses. A typical supply line 20 may have an initial size of about 2 inches in diameter from the supply outlet to about one-half the supply line. It will then be reduced to about 1½ inches through the remainder of the supply line and again to about ½ to ¾ inches at the last use site. The return line 22 will typically remain ½ to ¾ inches back to the pump inlet 40. The by-pass line 48 is preferably only about 8 to 10 inches in length and about ⅜ to ½ inches in diameter. The by-pass line 48 will have very low flow resistance compared to the circulating line 20–22.

While I have illustrated and described my invention by means of specific embodiments, it is to be understood that numerous changes and modifications may be made therein without departing from the spirit and scope of the invention, as defined in the appended claims.

I claim:

1. A recirculating hot water system comprising:
   a water heater for heating a continuous supply of hot water;
   a recirculating water line comprising a supply line connected to an outlet of said heater for conveying water from said heater to at least one use station and a return line for returning water not consumed at said station to said heater;
   a circulating pump in said return line for continuously circulating water in said water line;
   a by-pass circuit for by-passing said recirculating line connected at an outlet of said pump and an inlet to said pump; and
   a by-pass valve in said recirculating line at said by-pass line for directing water at a predetermined temperature through said by-pass line.

2. A hot water system according to claim 1 wherein said by-pass valve is temperature responsive.

3. A hot water system according to claim 2 wherein said valve is responsive to maintain a predetermined temperature differential between supply water from the boiler and return water to the heater.

4. A hot water system according to claim 1 wherein said valve is responsive to maintain a predetermined temperature differential between supply water form the heater and return water to the heater.

5. A hot water system according to claim 1 wherein said valve is temperature responsive for maintaining water flow at a predetermined minimum flow rate.

6. A hot water system according to claim 5 wherein said valve is responsive to maintain a predetermined temperature differential between supply water form the heater and return water to the heater.

7. An hot water system according to claim 5 wherein said temperature differential is from about 10°–25° Fahrenheit.

8. An apparatus according to claim 7 wherein said valve has an in line inlet and outlet ports for flowthrough of said circulating water, and one of said outlet ports being a by-pass outlet disposed at a 90 degree angle to said line inlet.

9. An apparatus according to claim 1 wherein said valve has inlet and outlet ports that are disposed in line for flowthrough of said circulating water, and a by-pass outlet port that is disposed at an angle normal thereto.

10. A continuously circulating hot water system comprising:
- a hot water heater for producing a continuous supply of hot water, said heater having a supply inlet, a return inlet and an outlet;
- a circulating water line system comprising a supply line connected to said outlet for conveying water to a plurality of use sites and a return line for returning water not consumed to said return inlet of said heater;
- a circulating pump having an inlet and an outlet, said pump disposed in said return line for continuously circulating water in said water line system; and
- a by-pass circuit including a temperature responsive valve in said return line between said outlet of said pump and return inlet of said heater and a recirculating line connected at a by-pass port of said valve and said inlet to said pump for directing water at a predetermined temperature through said by-pass line.

11. A hot water system according to claim 10 wherein said valve is responsive to maintain a predetermined temperature differential between supply water form the heater and return water to the heater.

12. A hot water system according to claim 11 wherein said valve is temperature responsive for maintaining water flow at a predetermined minimum flow rate.

13. A hot water system according to claim 10 wherein said valve is responsive to maintain a predetermined temperature differential between supply water form the boiler and return water to the boiler.

14. An hot water system according to claim 13 wherein said temperature differential is from about 10°–25° Fahrenheit.

15. An apparatus according to claim 14 wherein said valve has in line inlet and outlet ports for flowthrough of said circulating water, and one of said outlet ports being a by-pass outlet disposed at a 90 degree angle to said line inlet.

16. An apparatus according to claim 13 wherein said valve inlet and outlet ports that are disposed in line for flowthrough of said circulating water, and said by-pass outlet port is disposed at an angle normal thereto.

* * * * *